No. 774,254. PATENTED NOV. 8, 1904.
J. B. KLAMFOTH.
PEA VINE CUTTER.
APPLICATION FILED APR. 29, 1904.
NO MODEL.

WITNESSES:
Charles Lowell Howard
C. B. Bull

John B. Klamfoth, INVENTOR

BY
Geo. W. Rightmire,
his ATTORNEY

No. 774,254. Patented November 8, 1904.

UNITED STATES PATENT OFFICE.

JOHN B. KLAMFOTH, OF CANAL WINCHESTER, OHIO.

PEA-VINE CUTTER.

SPECIFICATION forming part of Letters Patent No. 774,254, dated November 8, 1904.

Application filed April 29, 1904. Serial No. 205,583. (No model.)

*To all whom it may concern:*

Be it known that I, JOHN B. KLAMFOTH, a citizen of the United States, residing at Canal Winchester, in the county of Franklin and State of Ohio, have invented certain new and useful Improvements in Pea-Vine Cutters, of which the following is a specification.

My invention relates to improvements in weed-cutters to be attached to cultivators, being especially adapted to the destruction of the weeds known as "pea-vines." As is well known, these vines not only spread over the surface of the ground, but also enwrap the stalk or hill of corn and choke the growth.
To destroy and remove them completely, it is necessary to cut below the surface horizontally between the rows and also to provide a vertical cutter to travel close to the row and sever from their stems such vines as enwrap the tender stalks of corn. On account of the toughness of the vines the vertical cutter should project forward and downward, its cutting edges being sloped from the bottom upwardly and backwardly in a curved form, then outwardly, forming a slight shoulder, then inwardly to the top thereof, thus enabling the cutting to be done both forwardly and upwardly, rendering it less likely that the vines in being cut will drag the corn. The vertical cutter is adjustably secured to the vertical arm of the horizontal cutter, which is likewise adjustably secured to the wing of the cultivator. The adjustment is obtained by means of slots in the several blades. I attain these objects by the devices illustrated in the accompanying drawings, in which—

Figure 1:
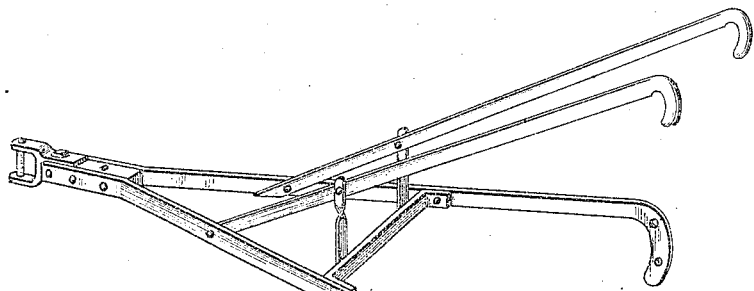
Figure 2:
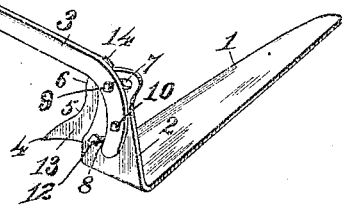
Figure 3:
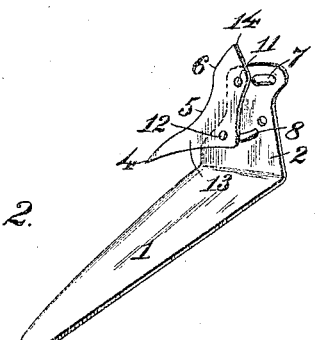

Figure 1 is a perspective view showing the cutter attached to the cultivator. Fig. 2 is a perspective view showing the triangular blade attached to the vertical arm of the horizontal blade and their positions relatively to each other. Fig. 3 illustrates the manner of securing the blades to the cutter and to each other and the manner of adjusting them.

Similar numerals refer to similar parts throughout the several views.

In the drawings, 1 represents the horizontal blade; 2, the vertical arm thereof, secured to the wing 3 of a cultivator, from which the shovels have been removed, by a bolt 9 inserted through the slot 7 and bolt 10 inserted through a bolt-hole.

13 represents the triangular cutter, vertically secured adjustably to the arm 2 by bolts 11 and 12, the latter being inserted through a slot 8.

4 is the lower point of the cutting face, adapted to travel on the surface or beneath.

5 shows the face curved inwardly, and outwardly at 6, and again receding to the top 14.

To operate, remove the shovels from a cultivator, as shown, secure the horizontal blade to the wing by means of bolts and adjust to cut at the angle and at the depth desired, secure the triangular blade to the vertical arm of the horizontal blade by means of bolts, and adjust to travel at the angle and depth desired. The triangular blade travels under the vines, and on account of its shape, as shown and described, cuts upward and forward and clears the corn, while the horizontal blade cuts between the rows. Thus all vines are severed without being removed, and the cutting is not hindered by the clogging of the vines between or against the blades.

My invention is simple in construction and devoid of parts likely to be easily deranged and is readily attached to any of the cultivators now in use. The vertical arm 2 may also be slotted to receive the bolt 10, thus providing for varying distances between the bolts in different cultivators. The cutting edge of the blade 13 may also be made a uniform curve, if desired, or a straight line; but better results can be obtained by the construction illustrated in the drawings.

What I claim as my invention, and desire to secure by Letters Patent, is—

1. In a pea-vine cutter, the combination of a triangular blade with a horizontal blade, the latter having a vertical arm to which said triangular blade is secured, and means for attaching same to a cultivator, substantially as described.

2. In a pea-vine cutter, the combination of a triangular blade with a horizontal blade, the latter having a vertical arm to which said triangular blade is removably and adjustably secured, and means for attaching the same to a cultivator, substantially as described.

3. In a pea-vine cutter, the combination of a triangular blade having the cutting edge curved outwardly, then inwardly, then outwardly, then inwardly, with a horizontal blade, the latter having a vertical arm to which the triangular blade is removably and adjustably secured, the whole being attached to a cultivator by means rendering the same adjustable and removable, substantially as set forth.

In testimony whereof I affix my signature in presence of two witnesses.

JOHN B. KLAMFOTH.

Witnesses:
 JOHN W. SHOOK,
 WILLIAM H. LANE.